United States Patent [19]

Leensvaart

[11] 4,046,480
[45] Sept. 6, 1977

[54] MOUNTING DEVICE FOR VEHICLE SHOCK ABSORBER

[76] Inventor: John R. Leensvaart, 17632 Wellington, Tustin, Calif. 92680

[21] Appl. No.: 654,348

[22] Filed: Feb. 2, 1976

[51] Int. Cl.$^2$ ............................................. F16B 39/36
[52] U.S. Cl. .................................................... 403/398
[58] Field of Search ...................... 403/398, 104, 106; 293/68, 99, 100, 101, 96, 68, 99–101; 248/357; 24/277, 135 M, 135

[56] References Cited

U.S. PATENT DOCUMENTS 3,847,428   11/1974   Vebelstadt ............................. 293/96

FOREIGN PATENT DOCUMENTS 150,905   9/1920   United Kingdom ................... 24/135

Primary Examiner—Robert B. Reeves
Assistant Examiner—Norman L. Stack, Jr.

[57] ABSTRACT

A mounting device for shock absorbers designed for attachment to vehicles, particularly with respect to half ton pick-up trucks. The device comprises a mounting truss plate having at least three holes disposed therein, two of which are positioned to receive "U"-shaped clamps adjacent each end of the truss plate whereby the plate can be secured to the axle of the vehicle. The third hole is centrally located between and below the first holes, and is adapted to have a well known shock absorber secured thereto.

1 Claim, 3 Drawing Figures

U.S. Patent  Sept. 6, 1977  4,046,480
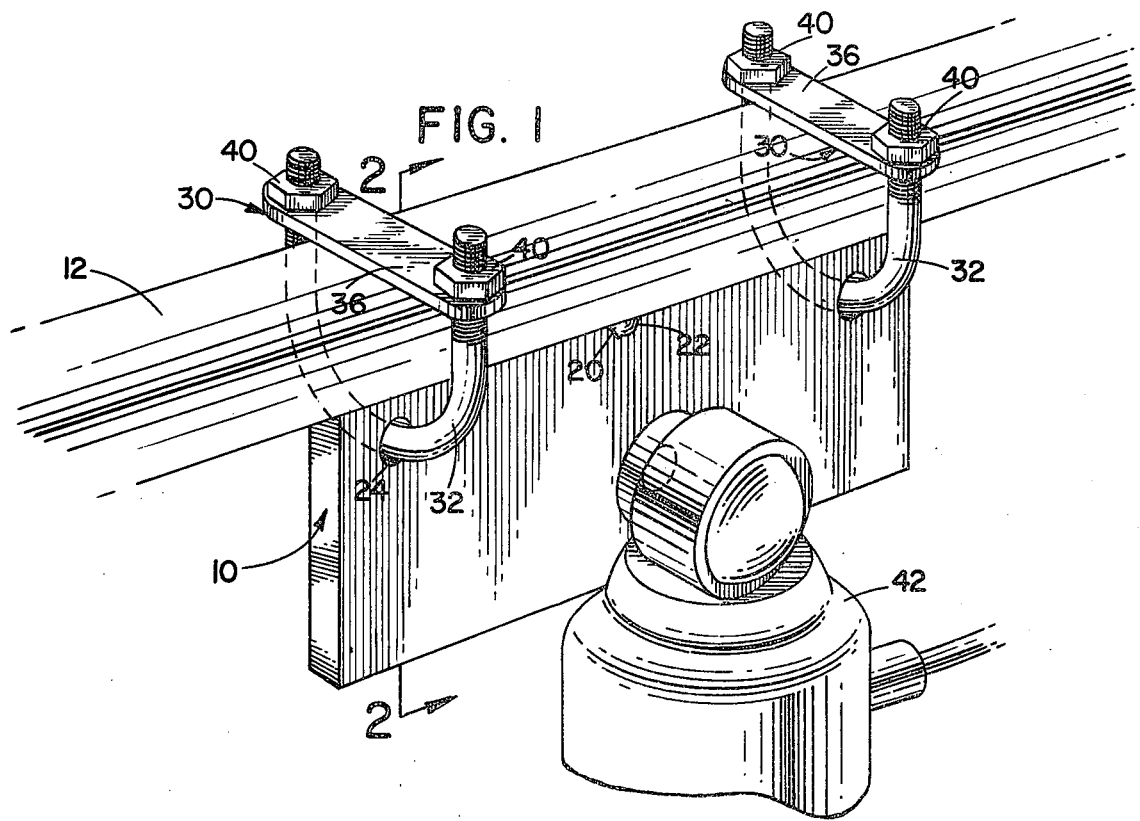
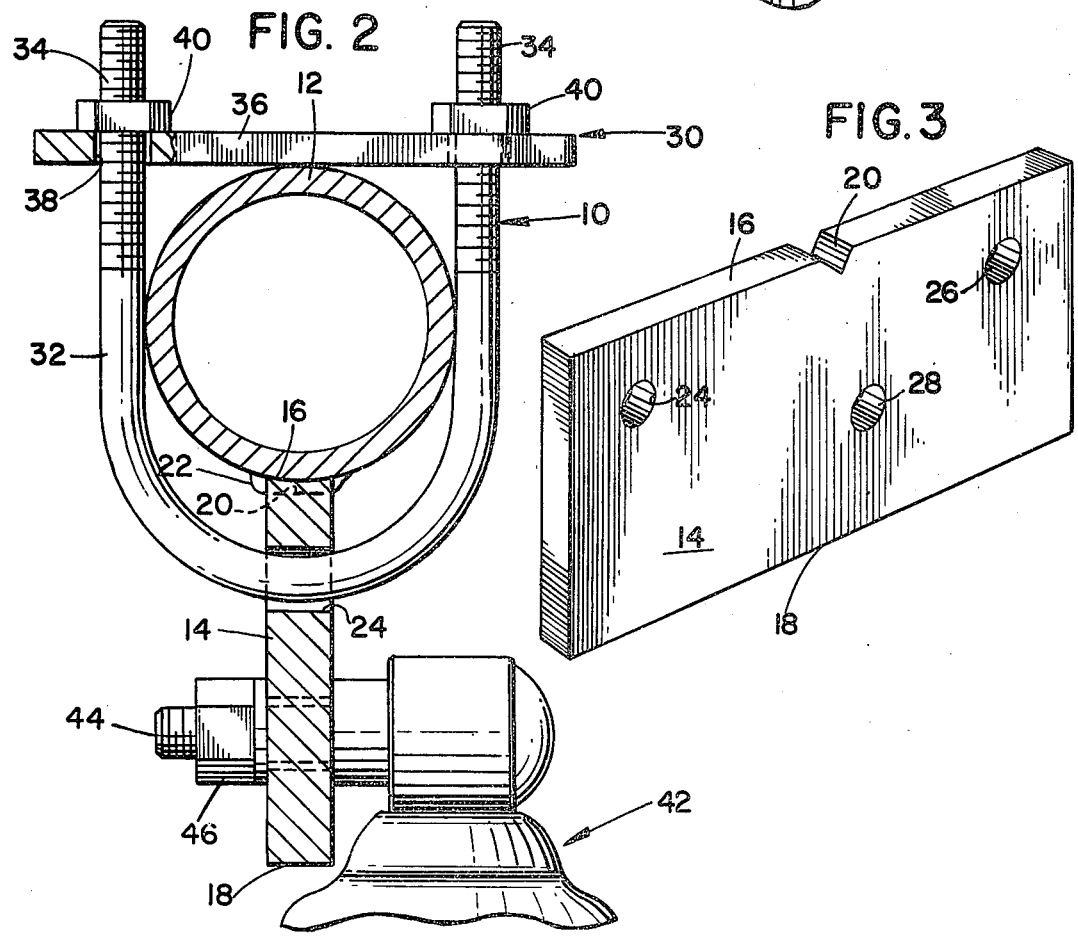

MOUNTING DEVICE FOR VEHICLE SHOCK ABSORBER

BACKGROUND OF THE INVENTION

1. Field of the Invention

This invention relates generally to a mounting device for vehicle shock absorbers, and more particularly to a mounting device for half ton pick-up trucks, wherein special shock absorbers of a particular type are now capable of being mounted thereto.

2. Description of the Prior Art

As is well known in the art, various problems and difficulties are encountered in providing suitable means for mounting special types of shock absorbers required by many vehicles, particularly with respect to small trucks and vans.

More specifically, the type of shock absorber which is of the air adjustable or automatic load-leveling variety can not be mounted to all vehicles, and must be provided with special fittings which, again, are very restrictive.

Thus, a need prevails whereby a simple universal mounting device can accommodate those shock absorbers having otherwise limited use.

SUMMARY OF THE INVENTION

The present invention comprises a mounting device for shock absorbers that will allow various types of shock absorbers to be mounted to vehicles such as half ton pick-ups manufactured from 1969 through 1975 by the Datsun Automotive Company of Japan.

With the installation of the present invention, various automatic shock absorbers and air-inflatable units can now be made available for use with the above mentioned trucks as well as several others.

The device comprises a truss plate having a plurality of specially arranged holes disposed therein, wherein at least two holes are horizontally aligned and each is adapted to receive a "U"-shaped clamp. These clamps are arranged to be bolted to the underside of the rear axle of the vehicle in such a manner as to allow direct connection of the shock absorber through a centrally disposed third hole positioned adjacent the lower edge of the truss plate, thereby allowing free movement of the shock absorber; the lower end of the shock being mounted to the vehicle in the usual well known manner.

Also formed in the upper edge of the truss plate is a notch which is adapted to receive a nob formed on most axle housings.

OBJECTS AND ADVANTAGES OF THE INVENTION

The present invention has for an important object a provision whereby various known shock absorbers of the automatic and air-adjustable type can now be used with respect to the various vehicles heretofore not capable of having such shock absorbers mounted thereto.

It is another object of the invention to provide a mounting device for shock absorbers that is so designed as to simply be mounted to both sides of the rear axle of such vehicles as half ton pick-up trucks and the like.

It is still another object of the invention to provide a device of this character that is simple to install with the average tools.

It is a further object of the invention to provide a device of this character that does not have any operating parts, thereby providing a unit that is easy to service and maintain.

It is still a further object of the invention to provide a device of this character that is simple and rugged in construction.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

DESCRIPTION OF THE DRAWINGS

Referring more particularly to the accompanying drawings, which are for illustrative purposes only:

FIG. 1 is a perspective view of the present invention showing the device in a typical secured manner;

FIG. 2 is an enlarged, cross-sectional view taken substantially along line 2—2 of FIG. 1; and FIG. 3 is a perspective view of the truss plate thereof.

DESCRIPTION OF THE PREFERRED EMBODIMENT

Referring more particularly to FIG. 1, there is shown a shock absorber mounting device, generally indicated at 10, being secured to a typical rear axle housing 12. The device has been designed to provide a shock absorber mounting unit in a kit form, whereby various shock absorbers of the automatic load-leveling type and the air-adjustable type can be operably mounted to several types and models of half ton pick-up vehicles.

The present invention comprises a truss plate 14 having a substantially rectangular configuration including an upper longitudinal edge 16 and a lower longitudinal edge 18. The upper edge can be made having a flat plane or the edge can be slightly concaved, forming a longitudinal, arcuate surface as, seen in FIG. 2. This surface allows a close, relatively-firm engagement with the annular surface of the axle housing 12.

In addition, the upper edge 16 has formed therein a notch 20 located centrally between each end of the truss plate, as clearly seen in FIG. 3. Said notch 20 will allow the nub 22, formed as part of most axle housings, to be received therein, thus providing a means to keep the truss in a restricted position relative to the longitudinal movement along the axle housing 12.

Also included in the truss plate 14 are a plurality of holes 24, 26 and 28 respectively. Holes 24 and 26 are aligned in the same horizontal plane adjacent and parallel to the upper edge 16; while hole 28 is disposed adjacent the lower edge 18 and centrally positioned between holes 24 and 26.

Holes 24 and 26 are so disposed as to receive securing means, generally indicated at 30, which comprise a "U"-shaped clap 32 having each free end provided with external threads 34. The "U"-shaped clamps are passed through each hole 24 and 26, as seen in FIGS. 1 and 2, and are positioned so that the upright free ends receive the axle housing 12 therebetween, with the free ends further extending upwardly therefrom. The added threaded portion of the free ends allows a clamping cross bar 36 to be disposed over said free ends by means of apertures 38 formed in the ends of cross bar 36. Nuts 40 are then threaded to the threaded free ends 34, thereby holding the truss plate in a rigid placement.

At this time, the particular shock absorber, generally indicated at 42, is secured to the mounting plate 14 in the well known manner by passing a bolt 44 through hole 28, the bolt being mounted to shock absorber 42, with its free end secured to plate 14 by nut 46.

As previously mentioned some vehicles are limited in the types of shock absorbers that can be used and, therefore, if one wants to install an automatic or the load-leveling type of shock absorber, the present invention as disclosed must be used.

The invention and its attendant advantages will be understood from the foregoing description and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

I claim:

1. A mounting device for special types of vehicle shock absorbers which because of various difficulties cannot be conventionally mounted, wherein the device is mounted to the axle of the vehicle thereof, the device comprising:
   a substantially rectangular truss plate having upper and lower longitudinal edges;
   the upper edge being formed with a longitudinal arcuate plane to receive said axle thereon in direct engagement;
   a transverse notch centrally disposed between the ends of such longitudinally arcuate upper edge to receive a nob formed in said axle, thereby preventing longitudinal movement of said truss plate;
   a plurality of holes disposed on said plate, wherein at least two holes are horizontally aligned in parallel relation to said upper edge thereof disposed adjacent each end of said truss plate, and a third hole centrally disposed between and below said first two holes and adjacent said lower edge of said truss plate, whereby the shock absorber is secured to said truss plate; and
   a clamping means formed by a "U"-shaped clamp having threaded, extending free ends, said clamp being received in said first two holes and positioned about the axle of the vehicle, and including a cross bar arranged to be disposed over each free end of said clamp having nuts threadably received on each threaded free end of said clamp.

* * * * *